United States Patent
Zhang et al.

(10) Patent No.: US 12,483,171 B2
(45) Date of Patent: Nov. 25, 2025

(54) PLUG AND PLAY SOLID STATE CONTROLLER FOR HIGH EFFICIENCY MOTORS

(71) Applicant: ABB Schweiz AG, Baden (CH)

(72) Inventors: Yuzhi Zhang, Apex, NC (US); Utkarsh Raheja, Raleigh, NC (US); Pietro Cairoli, Cary, NC (US); Xiaoqing Song, Apex, NC (US)

(73) Assignee: ABB Schweiz AG, Baden (CH)

( * ) Notice: Subject to any disclaimer, the term of this patent is extended or adjusted under 35 U.S.C. 154(b) by 163 days.

(21) Appl. No.: 18/543,995

(22) Filed: Dec. 18, 2023

(65) Prior Publication Data

US 2025/0202397 A1    Jun. 19, 2025

(51) Int. Cl.
| | |
|---|---|
| *H02P 1/26* | (2006.01) |
| *H02P 21/18* | (2016.01) |
| *H02P 21/22* | (2016.01) |
| *H02P 21/34* | (2016.01) |

(52) U.S. Cl.
CPC .............. *H02P 21/34* (2016.02); *H02P 21/18* (2016.02); *H02P 21/22* (2016.02)

(58) Field of Classification Search
CPC .......... H02P 21/34; H02P 21/18; H02P 21/22; H02P 1/04; H02P 1/28; H02P 29/02; H02P 29/032; H02P 29/40; H02P 1/26
See application file for complete search history.

(56) References Cited

U.S. PATENT DOCUMENTS

| | | | |
|---|---|---|---|
| 5,703,459 A | * 12/1997 | Yasohara | H02P 29/027 318/803 |
| 10,276,321 B2 | 4/2019 | Kennedy et al. | |
| 2014/0016235 A1 | 1/2014 | Koshizuka et al. | |
| 2015/0124885 A1 | 5/2015 | Jia et al. | |

(Continued)

FOREIGN PATENT DOCUMENTS

| | | |
|---|---|---|
| WO | WO 2015/124885 A1 | 8/2015 |
| WO | WO 2016/000774 A1 | 1/2016 |

OTHER PUBLICATIONS

European Patent Office, Extended European Search Report in European Patent Application No. 24220773.6, 8 pp. (Apr. 28, 2025).

*Primary Examiner* — Muhammad S Islam
(74) *Attorney, Agent, or Firm* — Leydig, Voit & Mayer, Ltd.

(57) ABSTRACT

A solid-state controller for limiting startup current in an induction motor is provided. The solid-state controller includes a first comparator configured to generate a first comparison based on comparing a rotor speed of the induction motor with a rotor speed threshold. The solid-state controller includes a phase current limiter configured to generate a startup current limit based on the comparison received from the first comparator. The solid-state controller includes a second comparator configured to generate a second comparison based on comparing a startup current of the induction motor with the startup current limit. The solid-state controller includes a microprocessor configured to generate a firing phase angle based on the second comparison, where the firing phase angle is a phase angle at which the solid-state controller is turned on, and generate a stopping time at which the solid-state controller is turned off.

14 Claims, 10 Drawing Sheets

(56) References Cited

U.S. PATENT DOCUMENTS

| | | |
|---|---|---|
| 2016/0000774 A1 | 1/2016 | Kaye |
| 2018/0181158 A1* | 6/2018 | Kanjavalappil Raveendranath .... G05F 5/00 |
| 2019/0089146 A1 | 3/2019 | Li et al. |
| 2019/0344411 A1 | 11/2019 | Leh et al. |

* cited by examiner

PLUG AND PLAY SOLID STATE CONTROLLER FOR HIGH EFFICIENCY MOTORS

FIELD

The present disclosure relates to starting up motors. In particular, the present disclosure relates to a plug and play solid state controller for reducing inrush current during startup of high speed efficiency motors.

BACKGROUND

High efficiency induction motors promise increased energy efficiency for industrial applications. However, high efficiency induction motors draw a higher starting current compared to standard efficiency DOL induction motors, because of reduced stator impedance. The higher starting current can lead to greater thermal stress on the protection devices. The high starting current can also lead to false tripping of the corresponding branch circuit breaker, either due to the increased inrush current (magnetic trip) or starting current (thermal trip). Conventional protection devices that are used to protect high efficiency motors from high inrush current and high startup current are resource intensive. Conventional protection devices are mainly based on an electromechanical type of starter, which can withstand such high starting current due to its low on-state resistance.

US 2019/0103742 A1 ("Kennedy 1") and U.S. Pat. No. 10,276,321 ("Kennedy 2") utilize high current rating semiconductor devices to withstand the higher inrush current, but this leads to higher cost. WO 2016/000774 A1 ("Baoliang") and WO 2015/124885 ("Elliot") connect semiconductor switches in parallel to distribute the inrush current in each device, thus the thermal stress is reduced. However, this method is resource intensive and the parasitic inductance impacts the current sharing performance. Conventional protection devices only increase the current capability of the motor controller. However, the inrush current and thermal stress in the high efficiency induction motors is still high which leads to faults. Thus, there is a need for improved protection devices for the high efficiency motors.

SUMMARY

A first aspect of the present disclosure provides a solid-state controller for limiting startup current in an induction motor. The solid-state controller comprises a first comparator configured to generate a first comparison based on comparing a rotor speed of the induction motor with a rotor speed threshold, a phase current limiter configured to generate a startup current limit based on the comparison received from the first comparator, a second comparator configured to generate a second comparison based on comparing a startup current of the induction motor with the startup current limit, and a microprocessor configured to: generate a firing phase angle based on the second comparison, wherein the firing phase angle is a phase angle at which the solid-state controller is turned on, and generate a stopping time at which the solid-state controller is turned off.

According to an implementation of the first aspect, the solid-state controller in the turned-on state connects the induction motor to a power source.

According to an implementation of the first aspect, the solid-state controller in the turned-off state disconnects the induction motor from a power source.

According to an implementation of the first aspect, the microprocessor is further configured to: determine a second rotor speed of the induction motor; generate a second startup current limit based on comparing the second rotor speed with the rotor speed threshold; generate a third comparison based on comparing the startup current with the second startup current limit; and based on determining that the startup current is greater than the second startup current limit, generate a second firing angle.

According to an implementation of the first aspect, the controller based on determining that the startup current is less than the second startup current limit, turn-on the solid-state controller at the firing angle.

According to an implementation of the first aspect, the microprocessor is further configured to turn on the solid-state controller based on determining that the induction motor is in normal operation.

According to an implementation of the first aspect, the rotor speed threshold is the regular operation speed of the induction motor.

A second aspect of the present disclosure provides a method for limiting startup current in an induction motor using a solid-state controller, the method comprising: providing a first comparator configured to generate a first comparison based on comparing a rotor speed of the induction motor with a rotor speed threshold; providing a phase current limiter configured to generate a startup current limit based on the comparison received from the first comparator; providing a second comparator configured to generate a second comparison based on comparing a startup current of the induction motor with the startup current limit; and providing a microprocessor configured to: generate a firing phase angle based on the second comparison, wherein the firing phase angle is a phase angle at which the solid-state controller is turned on; and generate a stopping time at which the solid-state controller is turned off.

According to an implementation of the second aspect, the solid-state controller in the turned-on state connects the induction motor to a power source.

According to an implementation of the second aspect, the solid-state controller in the turned-off state disconnects the induction motor from a power source.

According to an implementation of the second aspect, the microprocessor is further configured to: determine a second rotor speed of the induction motor; generate a second startup current limit based on comparing the second rotor speed with the rotor speed threshold; generate a third comparison based on comparing the startup current with the second startup current limit; and based on determining that the startup current is greater than the second startup current limit, generate a second firing angle.

According to an implementation of the second aspect, based on determining that the startup current is less than the second startup current limit, turn-on the solid-state controller at the firing angle.

According to an implementation of the second aspect, the microprocessor is further configured to turn on the solid-state controller based on determining that the induction motor is in normal operation.

According to an implementation of the second aspect, the rotor speed threshold is the regular operation speed of the induction motor.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
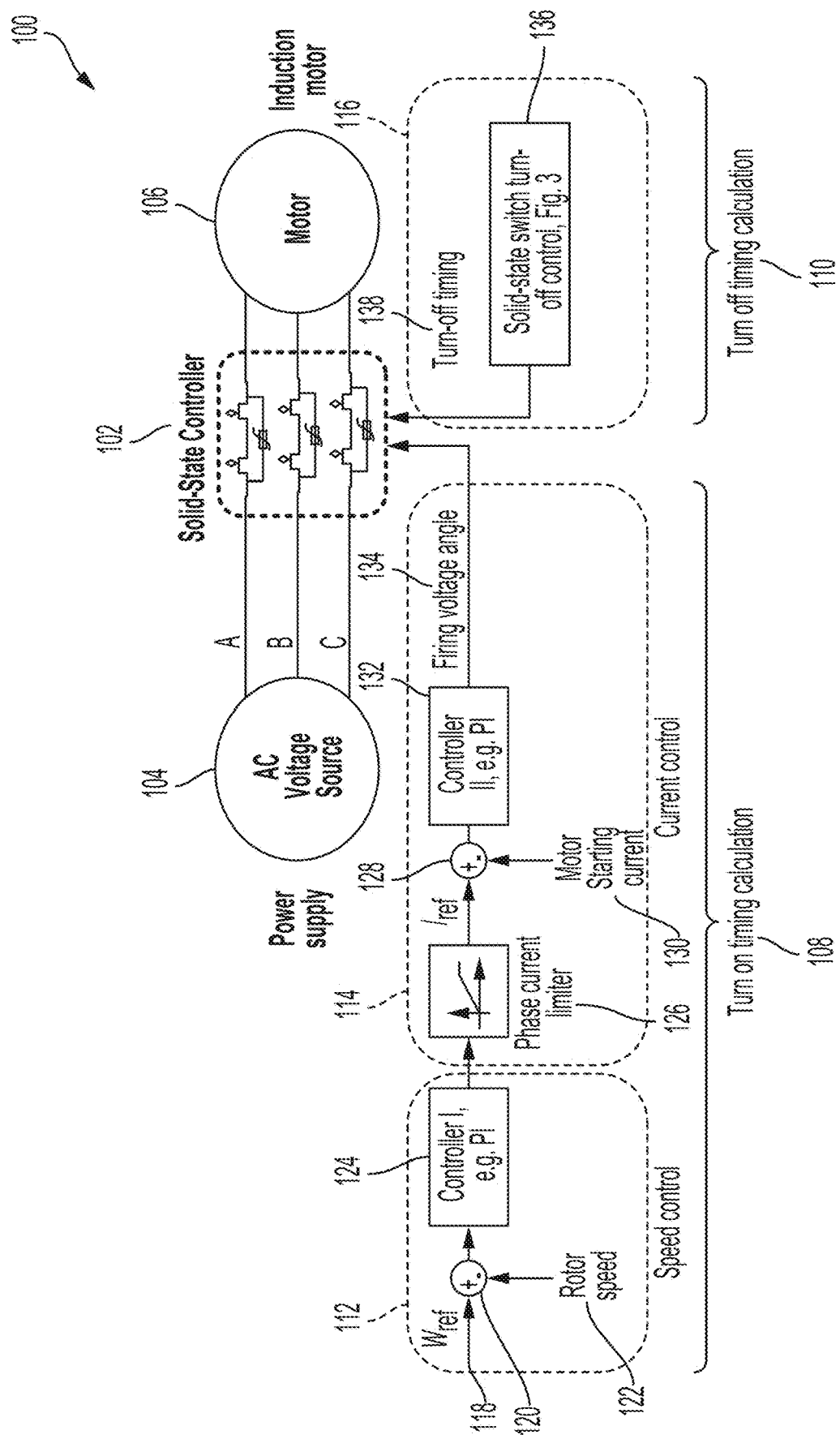
FIG. 1 illustrates a simplified block diagram for a solid-state controller, according to one or more examples of the present disclosure.

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

High efficiency induction motors are becoming increasingly attractive instead of standard motors due to energy savings, which also results in cost and emission reductions. There are different ways of improving the efficiency of a conventional DOL start induction machine. One of the ways is to reduce a few turns in the stator winding, reducing the winding resistance and hence, losses. However, this also results in an increased magnetizing current due to reduced magnetizing inductance. Thus, in addition to having an increased inrush current, the high efficiency motor also draws a high starting current, which can be more than eight times the nominal current. This high inrush current can be damaging for switches that are used as protection devices for the high efficiency induction motors. For example, with a one-to-one replacement of standard motors with high efficiency induction motors in an existing installation, the high inrush current can lead to high thermal stress on the semiconductor devices in a solid-state control switch and false tripping of the switchgear.

Replacement of standard motors with high efficiency induction motors in existing installations also requires a redesign of the protection components installed in the corresponding branch feeder leading to increased installation costs. High efficiency induction motors generate high magnetization and starting currents when connected direct online (DOL) or started. The high losses associated with the magnetizing current increase power dissipation requirements, cooling requirements and decrease the power density of solid-state controllers and solid-state switches in general.

Embodiments of the present invention provide a solid-state controller with semiconductor devices to reduce the starting flux of a high-efficiency induction motor. The on/off timing for the semiconductor devices of the controller is calculated based on current and/or speed feedback. In some embodiments, the controller includes two control loops to enable the high efficiency induction motor to reach a rated speed quickly and limit the inrush current level within a pre-set amplitude. The controller implements a control process that is uniform for different horsepower motors and mechanical loads. Using the controller to protect the high efficiency induction motor may reduce the inrush current, thermal stress and increase the power density of the solid-state controller. The control process enables direct replacement of standard efficiency induction motors in existing installations with high efficiency motors.

In some embodiments, the control process of the controller may limit the inrush and starting current of a line started motor to a preset value in order not to exceed inrush current standard requirements for motors, like high efficiency motors. The control process may limit the inrush current of general loads to a preset value to minimize the transient in the system (voltage deeps, overloads).

In some embodiments, a control process for a solid-state controller is provided that can be integrated with a high efficiency induction machine or operated in conjunction with an induction machine for direct-on-line applications. Using the control process, the controller may lower the maximum root-mean-square (rms) starting current, thus reducing the thermal stress on the protection devices, and improve the power density for the solid-state control switch, while enabling a direct replacement of standard efficiency DOL induction machines. On top of limiting the starting current of high efficiency general purpose induction motors to keep them within the limits indicated by the standards, the solid-state motor controller can add protection and monitoring functions to the motor.

FIG. 1 illustrates a simplified block diagram for a solid-state controller, according to one or more examples of the present disclosure. System 100 of FIG. 1 includes a solid-state controller 102 that controls power provided by a power supply 104 to a high efficiency induction motor 106. The solid-state controller 102 has two controller functions, a turn-on timing calculation 108 and a turn-off timing calculation 110. In some embodiments, the solid-state controller 102 is composed of metal oxide semiconductor field-effect transistors (MOSFETs) or insulated-gate bipolar transistors (IGBTs). The turn-on timing calculation is based on a speed control block 112 and a current control block 114. The speed control block 112 is used to assist the high efficiency induction motor 106 (also referred to as motor in this application) in the startup process when powered by the power supply 104. The speed control block 112 controls the startup speed of the high efficiency induction motor 106 by comparing a real time speed of the motor 106 as it starts up with a reference speed. As shown in FIG. 1, the speed control block 114 includes a comparator 120 that receives a reference speed 118 and a real time rotor speed 122. In some embodiments, the reference speed 118 is provided from a setup of the first controller 124 based on a nominal speed of the motor 106. In some cases, the reference speed 18 may be a fixe value or a value that a user could change when setting up the first controller 124 with the motor 106. The real time rotor speed 122 may be received from motor 106. In some embodiments, the reference speed 118 may be derived from a power rating of the high efficiency induction motor 106. For example, the reference speed 118 may be a normal speed of operation of a rotor of the high efficiency induction motor 106 under typical conditions. In such cases, the solid-state controller 102 is tasked with carefully turning on the high efficiency induction motor 106 to reduce inrush and startup current until the reference speed 118 of the rotor may be reached. In some cases, the real time rotor speed 122 may be received continuously from the high efficiency induction motor 106. Alternatively, the real time rotor speed 122 may be received at periodic intervals from the high efficiency induction motor 106, for example, one second, two seconds, etc.

The comparator 120 compares the received reference speed 118 to the real time rotor speed 122 of motor 106. The comparator 120 provides a result of the comparison to a first controller 124 that generates a difference between the reference speed 118 and the real time rotor speed 122 which is provided to a phase current limiter 126 of the current control block 114.

The current control block 114 includes a phase current limiter 126, a comparator 128 that receives a reference current from the phase current limiter 126 and real time motor starting current from motor 106. The comparator 128 compares the two values of current and provides a comparison result to a second controller 132. Using the comparison result, second controller 132 determines a phase angle at which the solid-state controller 102 is turned-on to provide power from the power supply 104 and provided to the motor 106.

In some embodiments, the phase current limiter 126 is used to prevent the overheating of the solid-state controller 102. For example, the phase current limiter 126 receives the difference between the real time rotor speed 122 and the reference speed 118 from the first controller 124. This computed difference is used by the phase current limiter 126 to generate a reference current ($I_{ref}$). In some embodiments, the reference current ($I_{ref}$) is generated to cap the inrush current flowing into the motor 106 from the power supply 104. The $I_{ref}$ is compared to the starting current of the motor 130 received from the motor 106. The result of the comparison is provided by the comparator 128 to the second controller 132. The second controller 132 uses the comparison received from the comparator 128 to determine a firing phase angle ($\alpha$) 134 at which the solid state-controller 102 allows current from the power supply 104 to the motor 106. Therefore, the solid-state controller 102 is only activated for a short period of time to allow current to flow from the power supply 104 to the motor 106. For example, the solid-state controller 102 is turned on only for a certain portion of the phase cycle of current from the power source 104, starting at the firing phase angle $\alpha$ and not the full cycle of current from the power source 104. By restricting the phase angle at which current is provided from the power supply 104 to the motor 106, the solid-state controller 102 is able to reduce the inrush current flowing into the motor 106.

After the solid-state controller 102 is turned on to allow current to flow from the power supply 104 to the motor 106 at a particular time using the turn-on timing calculation 108, the solid-state controller 102 has to be turned off after some time to reduce the inrush current in the motor 106. The turn-off timing calculation 110 determines when the solid-state controller 102 is turned off thereby turning off current from the power supply 104 to the motor 106. In some embodiments, the turn-off calculation may be implemented in two ways. A first way to implement the turn-off calculation is non-zero current turn-off and a second way to implement turn-off calculation is zero current turn-off. In some cases, the turn-on time of the solid-state controller 102 is proportional to a voltage average value. The voltage average value, when applied to an inductive impedance like the motor is proportional to current through the motor 106. The turn-on time depends on both a turn-on delay and the turn-off time. The turn-off time may be at zero current turn-off, or zero crossing minus some time that is determined by the turn-on time needed from a second controller 132 to control the motor 106 current through the firing angle.

In some embodiments, the non-zero current turn-off of the solid-state controller 102 requires a voltage clamping device or circuit to protect the solid-state switch 102.

In some embodiments, when the zero current turn-off is implemented for the turn-off timing calculation 110, the semiconductors (e.g., MOSFETs or IGBTs) of the solid-state controller 102 are turned off when current from the power supply 104 crosses zero, to prevent a voltage spike during the turn off of the solid-state controller 102. In order to implement zero current turn-off, two different methods may be implemented. In a first method, zero-current turn-off is implemented by measuring the voltage drop across the different semiconductor devices of the solid-state controller 102. In a second method, zero-current turn-off is implemented by measuring the current flowing through the solid-state controller 102. Once the turn-off time is determined by the turn-off timing calculation process a turn-off signal is provided to the solid-state controller 102 to turn off and restrict the flow of current from power supply 104 to motor 106.

In some embodiments, the real time rotation speed 122 and the real time motor current of the high efficiency induction motor 106 are provided to the solid-state controller 102 regularly at periodic intervals, such as 1 second, two seconds, etc., which creates feedback loops. Using the signals received at regular intervals, the solid-state controller 102 is turned on when current from the power supply reaches an initial starting voltage angle $\alpha$. The initial starting angle $\alpha$ is determined using the turn-on timing calculation 108 that includes speed control block 112 and current control block 114. The solid state controller 102 is turned off at a time as calculated by turn-off timing calculation process 110. Subsequently, in the next voltage cycle, the starting voltage angle may be adjusted based on the previous cycle's starting current amplitude. In some embodiments, if the starting current amplitude is higher than the pre-set limit, then the next cycle's motor starting time will be reduced by changing the starting angle from $\alpha$ to $\alpha'$. In some embodiments, changing the starting angle from α to α' may also lead to a change in the $I_{ref}$. This process will be repeated until the motor is fully started. In some embodiments, the determination of whether the high efficiency induction motor 106 is fully started is based on determining whether the rotor speed of the high efficiency induction motor 106 is the same as the reference speed that is based on the rating of the high efficiency induction motor 106. In some embodiments, the first controller 124 and the second controller 132 may be proportional-integral PI controllers.

Figure 2:
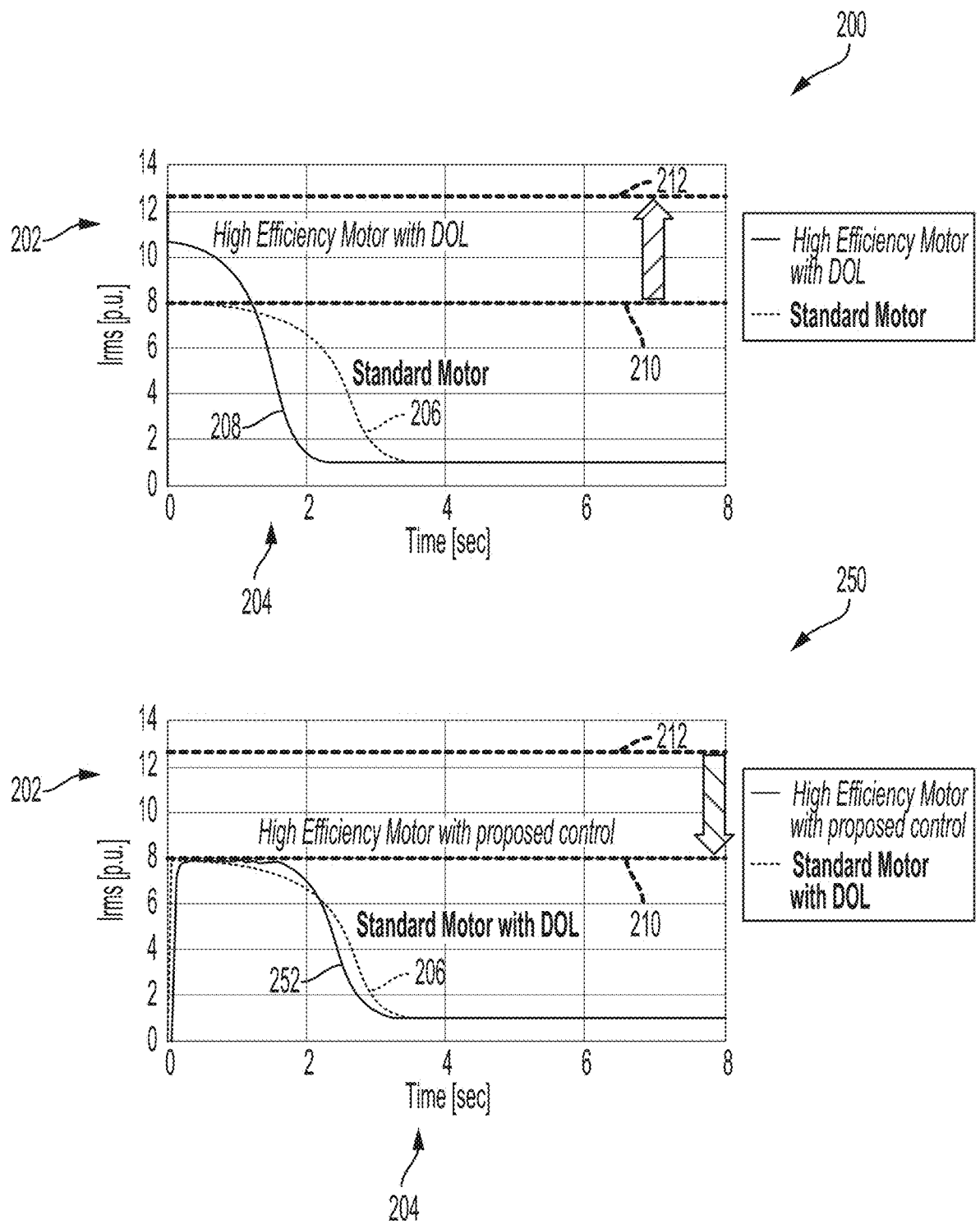
FIG. 2 depicts graphs related to operations of a solid-state controller, according to one or more examples of the present disclosure.

FIG. 2 depicts graphs related to operations of a solid-state controller, according to one or more examples of the present disclosure. FIG. 2 includes graphs 200 and 250 that illustrate how the solid-state controller 102 improves the starting of a DOL motor, e.g., high efficiency induction motor 106. Graph 200 and 250 plots the rms value of current ($I_{rms}$) through the motor on the y-axis 202 and time on the x-axis 204. Graph 200 includes two curves 206 and 208. Curve 206 depicts the starting current of a standard induction motor 206. In some embodiments, the staring current of a standard induction motor as depicted by curve 206 is approximately eight times the regular current. Curve 208 depicts the starting current of a high efficiency motor with direct online start. As is seen from graph 200, the starting current of a standard induction motor as shown by curve 206 starts at level 210, whereas the starting current of a high efficiency induction motor 106 with direct online start is at level 212, which is higher than 210. This implies that a high efficiency induction motor 106, when starting up may draw current that is more than eight times the regular operational current of the high efficiency induction motor 106, leaving it open to damage.

Graph 250 includes two curves 206 and 252. Curve 206 as described above, depicts the starting current of a standard induction motor 206. Curve 252 depicts the starting current of a high efficiency motor with direct online start when used in conjunction of the solid-state controller 102. As is seen from graph 250, the starting current of a high efficiency motor used in conjunction with solid-state controller 102 as shown by curve 252 starts at level 210, which is the same level as the starting current of the standard induction motor as described above.

Thus, it is observed that the addition of the solid-state controller 102 may limit the starting current of the motor to about eight times the regular operational current of the high efficiency induction motor 106, which is similar to a standard induction motor and still start the motor 106 in a way that is like a classic DOL start/line start.

Figure 3:
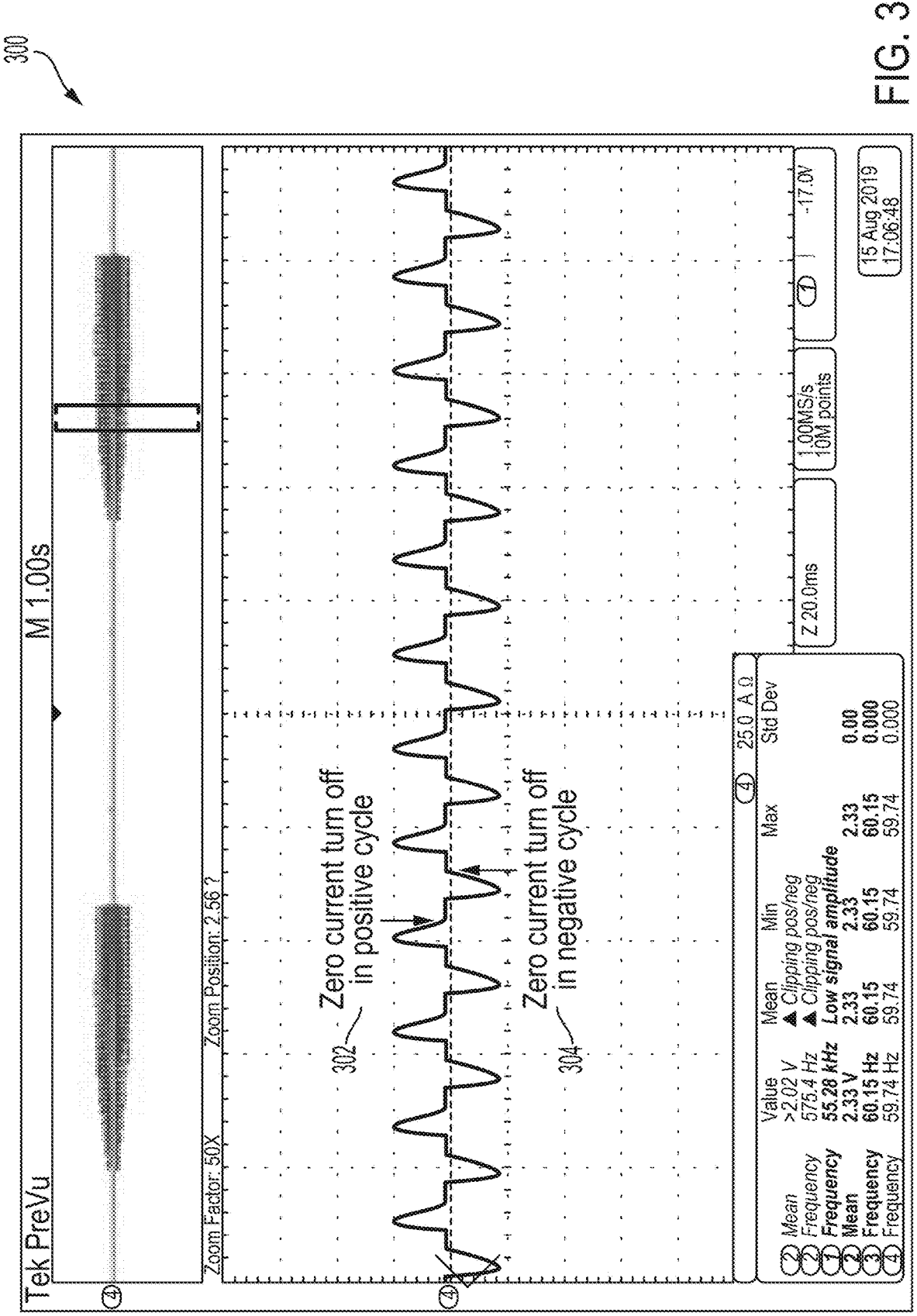
FIG. 3 depicts graphs related to zero current turn-off with SiC MOSFET devices, according to one or more examples of the present disclosure.

FIG. 3 includes graphs related to zero current turn-off with SiC MOSFET devices, according to one or more examples of the present disclosure. In some embodiments, FIG. 3 depicts the test results of zero current turn-off as implemented in the solid-state controller 102. The graph 300 of FIG. 3 shows points 302 and 304. Points 302 and 304 depict a time at which the solid-state controller 102 is turned off. As is seen from the graph 300, the solid-state controller 102 is turned off at points 302 and 304, when the current through the solid-state controller 102 is almost zero. Because the solid-state controller 102 is turned off when the current is zero, very small voltage spikes are produced. By implementing zero-current turn-off, the operation lifetime and reliability of motor 102 can be improved.

Figure 4:
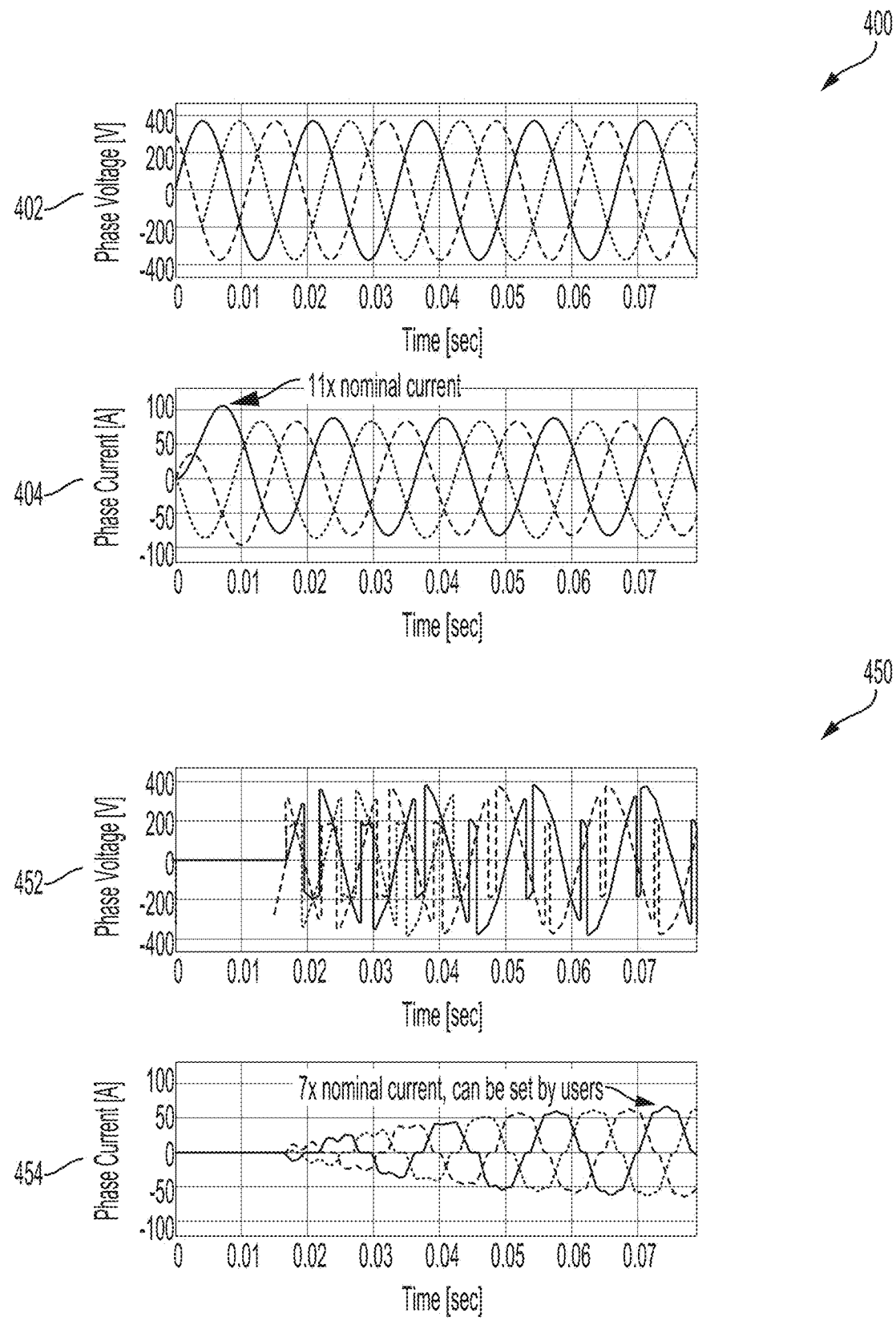
FIG. 4 depicts graphs related to magnetization current peaks, according to one or more examples of the present disclosure.

FIG. 4 includes graphs related to magnetization current peaks, according to one or more examples of the present disclosure. Graphs 402 and 404 depict the operating conditions of a high efficiency induction motor when it starts with a conventional DOL starting method, without the use of a solid-state controller 102. Graph 402 plots the phase voltage of the high efficiency induction motor on the y-axis against time on the x-axis. Graph 404 plots the phase current of the high efficiency induction motor on the y-axis against time on the x-axis. As is clear from graphs 402 and 404, the starting phase current of the high efficiency induction motor when used without the solid-state controller 102 is eleven times the nominal current.

Graphs 452 and 454 depict the operating conditions of a high efficiency induction motor 106 as it starts with a conventional DOL starting method, when used with a solid-state controller 102. Graph 452 plots the phase voltage of the high efficiency induction motor on the y-axis against time on the x-axis. Graph 454 plots the phase current of the high efficiency induction motor 106 on the y-axis against time on the x-axis. As is clear from graphs 452 and 454, the starting phase current of the high efficiency induction motor 106 when used with the solid-state controller 102 is about seven times the regular operational current, which is the same as the startup current of a standard induction motor. In some embodiments, the startup current of the high efficiency induction motor, when used in conjunction with the solid-state controller 102, may be restricted to a set value.

Figure 5:
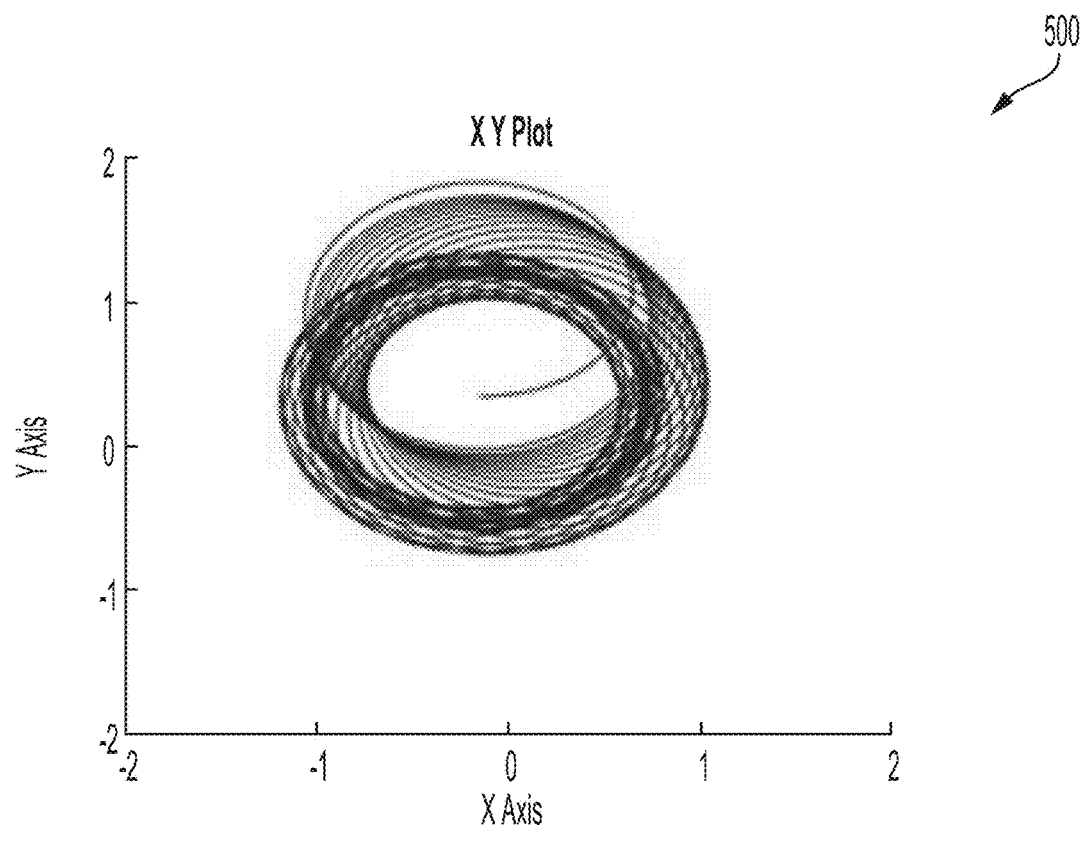
FIG. 5 depicts plots related to magnetization current of a high efficiency induction motor, according to one or more examples of the present disclosure.
Figure 5:
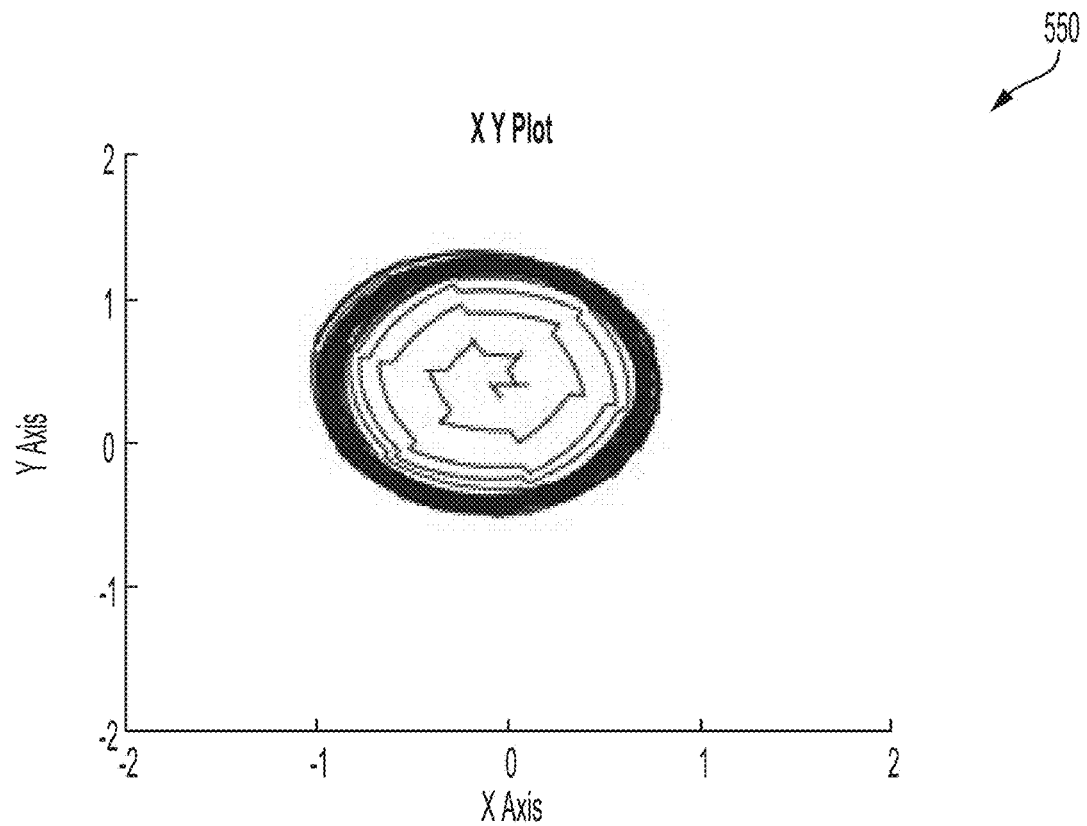

FIG. 5 depicts plots related to magnetization current of a high efficiency induction motor, according to one or more examples of the present disclosure. Plot 500 of FIG. 5 depicts the rotor flux of a high efficiency induction motor when operated without the solid-state controller 102 and plot 550 of FIG. 5 depicts the rotor flux of a high efficiency induction motor when operated with the solid-state controller 102. As is seen in plot 500, when the high efficiency induction motor is turned on without a slid-state controller 102, the rotor flux in the motor does not stay within the 1 plotting unit circle as shown. In some embodiments, the plotting unit may be obtained by dividing a value of a quantity by a nominal value of the quantity. This may lead to saturation of the core of the high efficiency induction motor, which in turn may lead to high starting current. On the other hand, plot 550 depicts that when the high efficiency induction motor is operated in conjunction with the solid-state controller 102, the rms value of the motor phase current is limited to the designed value and the rotor flux is within the 1 plotting unit circle.

By reducing the starting current of the high efficiency induction motor, the current and thermal stress can be reduced, thus increasing the power density of a solid-state controller 102, and reducing the semiconductor device requirements, leading to lower costs. Moreover, the control enables a one-to-one replacement of conventional DOL start induction machines, without changing the protection device requirements.

In some embodiments, the solid-state controller 102 limits the starting current for high efficiency motors. The solid-state controller 102 includes semiconductor switching devices on timing and off timing the current from power source 104 to motor 106 to limit the starting current of the motor. The solid-state controller 102 is designed as a uniform control for a wide range of mechanical load and horsepower of induction motors.

Figure 6:
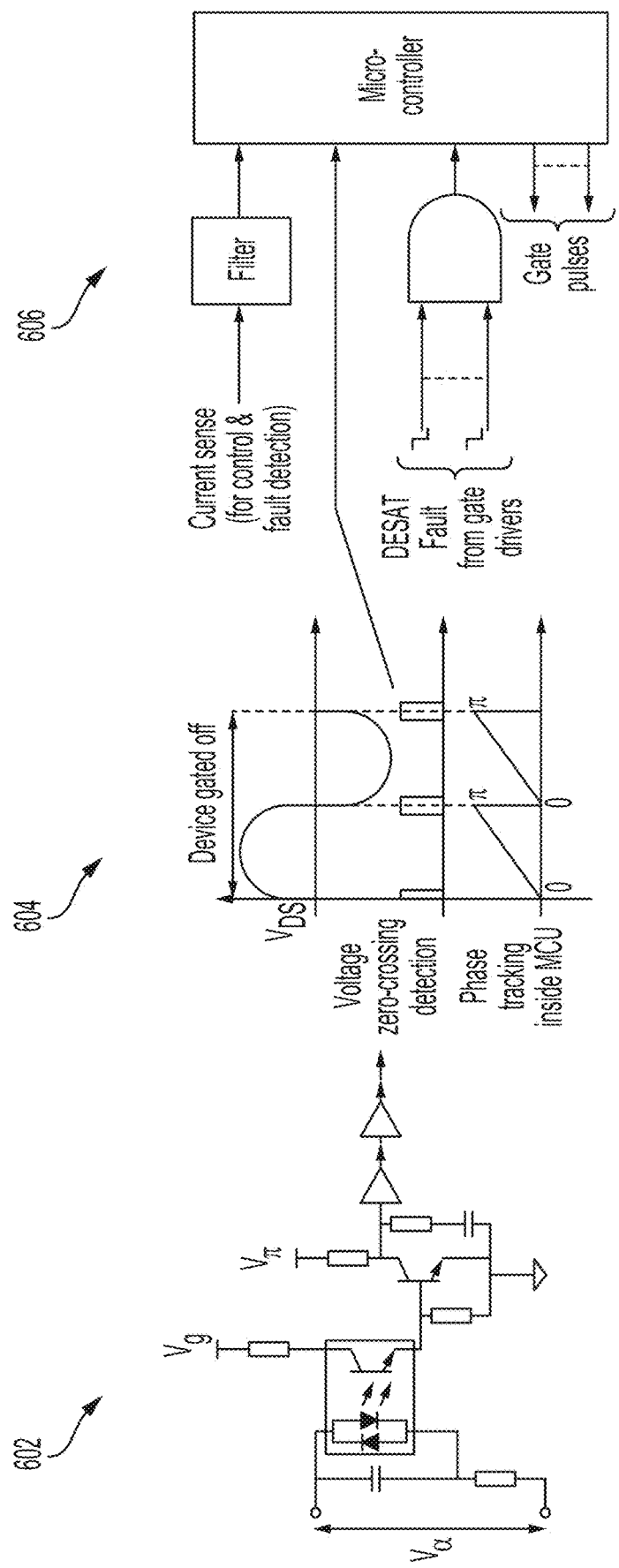
FIG. 6 depicts a hardware design for a solid-state motor controller, according to one or more examples of the present disclosure.

FIG. 6 depicts a hardware design for a solid-state motor controller, according to one or more examples of the present disclosure. FIG. 6 depicts an analog circuit 602, a graph 604 and a digital circuit 606. In some embodiments, the hardware design of the solid-state controller 102 includes an analog portion as shown by analog circuit 602 and a digital circuit 606. The analog circuit 602 includes a comparator, op-amp, logic ports, etc. These components are used to make sensing circuits or signal conditioning circuits that provide signals to a microcontroller of the digital circuit 606. In some embodiments, the sensing circuits include current and voltage sensing signals, which are provided to the microcontroller of the digital circuit 606. In some embodiments, analog circuit 602 is a voltage sensing circuit that is used to detect voltage crossing (as shown in 702 of FIG. 7) for determining the reference for the firing angle (α) and zero current turn-off, as explained earlier.

Graphs 604 are generated based on the voltage and current signals that are provided by the current and voltage sensing circuits of the analog circuit 602. The graphs 604 include a voltage graph, a detection of voltage zero-crossing and phase tracking.

Signals from the analog circuit 602 are provided to the digital circuit 606. In some embodiments, the digital circuit 606 may include a microcontroller, microprocessor, field-programmable gate arrays (FPGA), or Complex Programmable Logic Devices (CPLD). In some embodiments, the microcontroller of digital circuit 606 receives signals from the analog 602. The microcontroller shown in digital circuit 606 receives various signals such as current signals, and fault signals from gate drivers. After processing these signals, the microcontroller provides gate pulses to the semiconductors of the solid-state controller 102. In some embodiments, the gate pulses provided by the microcontroller 102 are responsible for turning off or turning on the semiconductors of the solid-state controller 102 to regulate the inrush current into the high efficiency induction motor.

In some embodiments, the solid-state controller 102 may be applied in motor controllers, soft starters, and motor starts. In some cases, the solid-state controller 102 may be applied in high efficiency induction motors that are operated direct on-line (DOL). The solid-state controller 102 may be implemented for the control of generic loads according to IEC standard mode of operation AC-51 and for the control of motor loads according to IEC standard mode of operation AC-53. In some embodiments, the solid-state controller 102 may be implemented in solid-state circuit breakers (MCB, RCD, molded circuit breakers, air circuit breakers, etc.) with motor loads. In some examples, the solid-state controller 102 may also be implemented with solid state contactors and solid state circuit breakers with a transformer load, and a high efficiency transformer load.

Figure 7:
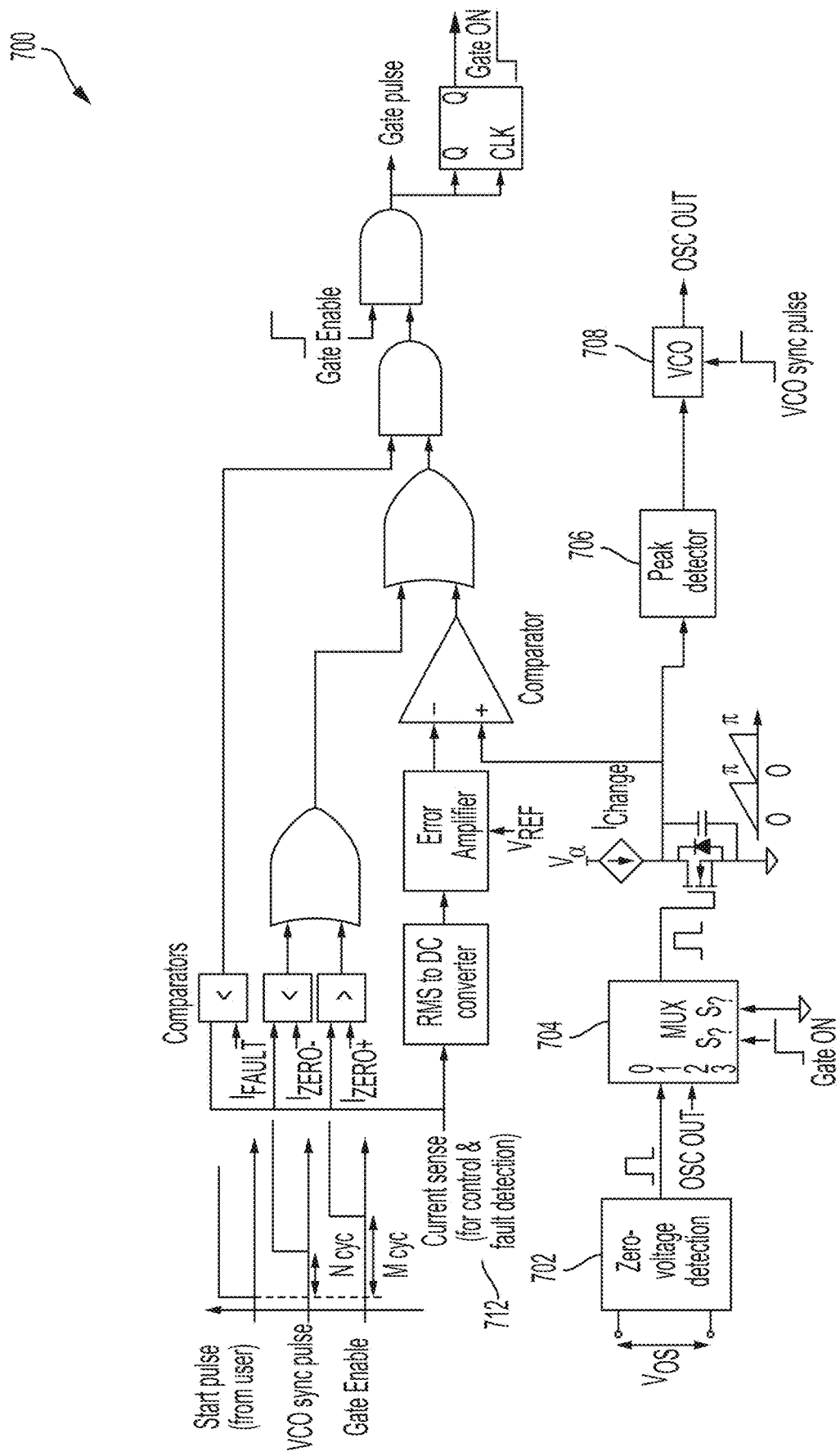
FIG. 7 depicts an alternate hardware design for a solid-state motor controller, according to one or more examples of the present disclosure.

In some cases, there are alternative ways to build the control circuit for solid-state controller 102. For example, the microcontroller of the solid-state controller 102 may be based on device voltage zero-crossing detection when the motor is in an off-state before a gate enable. FIG. 7 depicts an alternate hardware design for a solid-state motor controller, according to one or more examples of the present disclosure. In such examples, the supply voltage phase can be sensed using direct $V_{L-L}$ (Voltage Line-to-Line) measurement instead of $V_{L-N}$ (Voltage Line-to-Neutral) measurement (since access to a neutral connection may not be available). In some embodiments, the analog circuits of the alternate design in FIG. 7 are implementations of the turn-on timing calculations 108 and the turn-off timing calculations 110 as shown in FIG. 1, which control a power circuit of solid-state controller 102.

The zero-voltage detection block 702 may be used with the measurement of $V_{L-L}$ and the resultant pulses may be phase-shifted to generate the zero-crossing detection pulses for $V_{L-N}$. The rest of the circuit can be the same as shown in FIG. 6. However, there may be no need for the MUX 704, peak-detector 706, and VCO 708 since the voltage information is available regardless of the state of the control switches.

In some embodiments, current sensing signals using the voltage drop across the device in the on-state may be used as an alternative method to measure current indirectly without using a direct current sensor because the voltage drop across the device is proportional to the current. Since the voltage drop is temperature dependent, a junction temperature estimate may be used to compensate for the temperature dependence. In some embodiments, temperature dependence may vary by devices. For example, common MOSFETs have a linear relationship of a device resistance versus temperature. There is a linear curve shown in FIG. 7 that describes the dependency. The junction temperature estimation can be done based on the case temperature measurement and the package thermal network. In conjunction with the I-V plots at different junction temperatures, the current can be estimated and used for the control. Moreover, the device voltage of any of the semiconductors of the solid-state controller 102 in the on-state can be directly used to trip the device if a set threshold is exceeded, similar to de-saturation (DESAT) protection, allowing fast fault protection with minimal additional circuit.

In some embodiments, in the overload protection mode, the current limitation control also can be implemented to control the overcurrent with the desired level. The overcurrent level can be made adjustable to ensure device junction temperature is within the safe range. The junction temperature can be an estimate based on the case temperature measurement and the thermal network characterization. The adjustment in overcurrent level can help ensure safe device operation under harsh operating conditions such as higher than rated ambient temperature, high frequency start-stop operation, etc.

In some embodiments, alternative ways to build a solid-state motor controller include using system-in-chip (SIC) MOSFETs or JFETs as semiconductors. In some other examples, Gallium nitride (GaN) FETs such as HEMTs and GITs are used as semiconductors. In some cases, silicon (Si) IGBTs or MOSFETs may be used as semiconductors. In some other cases, other fully controllable power semiconductor devices, such as IGTC, GTO, ETO, and more may be used as semiconductors for the solid-state controller 102.

Figure 8:
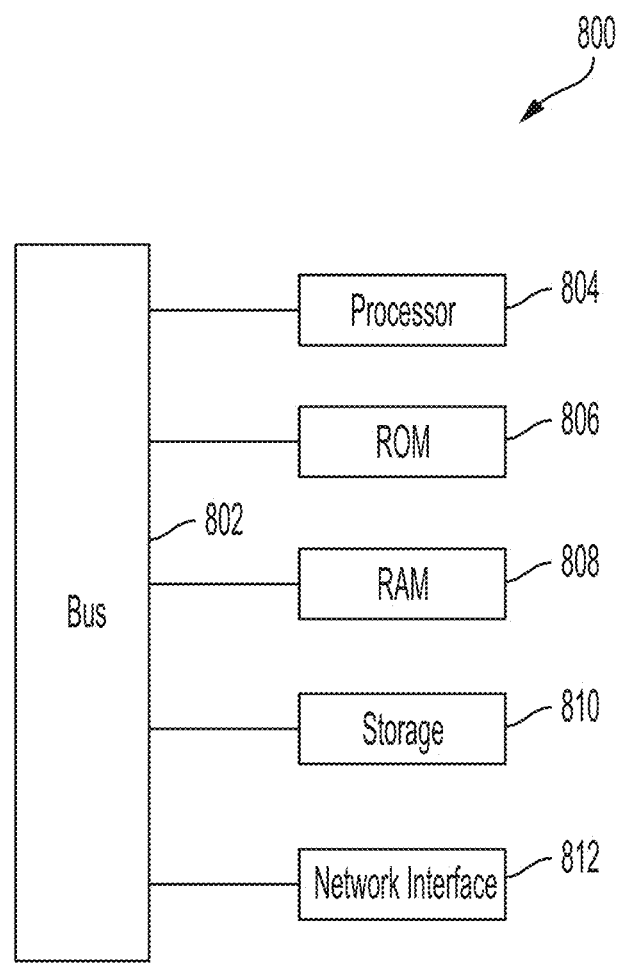
FIG. 8 is a simplified block diagram of one or more devices or systems within the exemplary environment of FIG. 1, according to one or more examples of the present disclosure.

FIG. 8 is a block diagram of an exemplary system or device such as the solid-state controller 102. The system 800 includes a processor 804, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 810, which may be a hard drive or flash drive. Read Only Memory (ROM) 806 includes computer executable instructions for initializing the processor 804, while the random-access memory (RAM) 808 is the main memory for loading and processing instructions executed by the processor 804. The network interface 812 may connect to a wired network or cellular network and to a local area network or wide area network. The system 800 may also include a bus 802 that connects the processor 804, ROM 806, RAM 808, storage 810, and/or the network interface 812. The components within the system 800 may use the bus 802 to communicate with each other. The components within the system 800 are merely exemplary and might not be inclusive of every component within the controller 102. Additionally, and/or alternatively, the system 100 may further include components that might not be included within every entity of system 800. For instance, in some examples, the controller 102 might not include a network interface 812.

Figure 9:
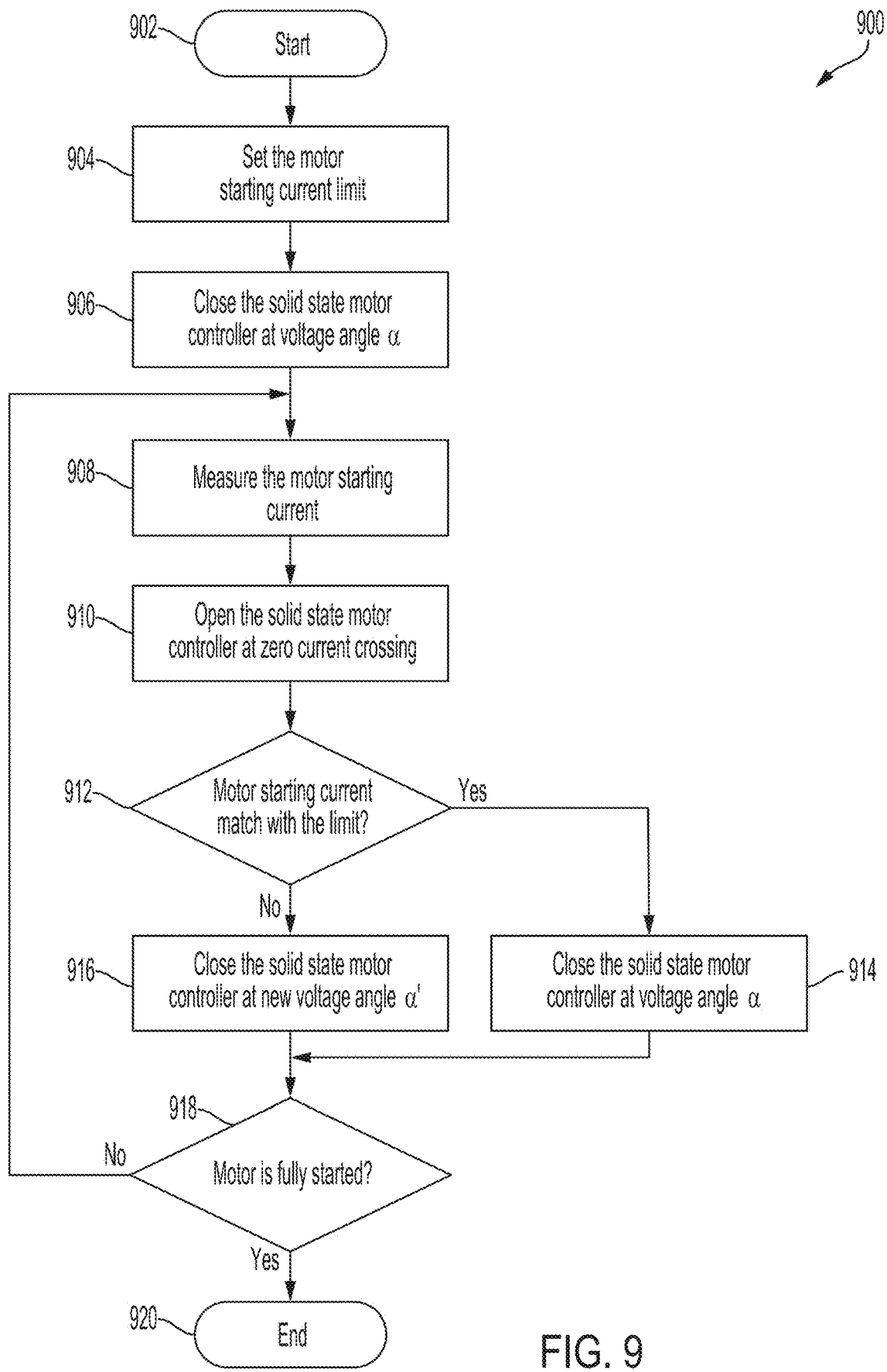
FIG. 9 illustrates a process performed by a solid-state controller, according to one or more examples of the present disclosure.

In some embodiments, the use of the solid-state controller 102 is able to limit the inrush and starting current for high efficiency motors. The solid-state controller 102 also limits the high inrush and magnetization currents without interfering in the operation of the high efficiency induction motor. The use of solid-state controller 102 increases power density and reduces the cost of solid-state controllers for application in high efficiency induction motors. In some embodiments, the solid-state controller 102 provides uniform control for a wide range mechanical load and horsepower (HP) of induction motors. In some cases, the solid-state controller 102 reduces starting current reduction in a wide range mechanical load and HP of high efficiency induction motors. In some cases, the solid-state controller 102 reduces inrush current for a generic load to avoid voltage perturbations in the system, reduction of power quality, and cable overloads FIG. 9 illustrates a process performed by a solid-state controller, according to one or more examples of the present disclosure. It will be recognized that any of the following blocks may be performed in any suitable order and that the process 900 may be performed in any environment and by any suitable computing device and/or controller.

At 902, the solid-state controller 102 initiates a startup of a high efficiency induction motor 106. The solid-state controller 102 is implemented between a high efficiency induction motor 106 and a power supply 104 to regulate the inrush current from the power supply 104 to the high efficiency induction motor 106. The solid-state controller 102 receives signals from the high efficiency induction motor 106, such as a rotation speed and a current. In some embodiments, the rotation speed and current signals may be received periodically at the solid-state controller 102. Based on the received signals, the solid-state controller 102 provides control signals to regulate the flow of current from the power supply 104 to the high efficiency induction motor 106.

At 904, a motor current starting limit is set. For example, the motor current starting limit may be set by a first controller 124 of the solid-state controller 102 based on receiving a comparison value from a comparator 120. In some embodiments, the comparator 120 provides a comparison of the rotor speed of the high efficiency induction motor 106 and a reference motor speed. As discussed above, the reference motor speed may be derived from a rotor rating, which provides a normal speed of operation of the high efficiency induction motor 106.

At 906, the solid-state controller 102 is closed at a voltage angle α. For example, once the current from the power supply 104 reaches the firing angle α, the solid-state controller 102 turns on an allows current to flow from the power supply 104 to the high efficiency induction motor 106. In some examples, the firing angle α is determined by a second controller 132 based on the starting current received from the induction motor 106 and the motor current starting limit that is set previously. By turning on only when current from the power supply reaches the firing angle α, the solid-state controller 102 allows the power supply 104 to provide current to the high efficiency induction motor 106 for a part of the phase cycle of the current, to restrict inrush current.

At 908, the solid-state controller 102 is configured to measure the starting current of high efficiency induction motor. For example, the inrush current of the high efficiency induction motor 106 may be measured and compared to a motor current starting limit that is determined previously.

At 910, the solid-state controller 102 is opened at a zero current crossing. For example, after the solid-state controller 102 is turned on at firing angle α, as discussed previously, the solid-state controller 102 may determine a time at which the current should be turned off. In some embodiments, the solid-state controller 102 may implement a zero-current turn-off, which means the semiconductors of the solid-state controller 102 are turned off when current crosses zero.

At 912, the solid-state controller determines whether the measured starting current of the high efficiency induction motor is within the motor current starting limit determined previously. In response to determining that the measured current is within the motor current starting limit, the process 900 moves to 914 to repeat the process in the next current cycle. For example, once the measured current is determined to be within the motor current starting limit, the solid-state controller 102 turns on again when the current of the power supply reaches firing angle α.

At 916, in response to determining that the measured current exceeds the motor current starting limit, the process 900 proceeds to 916 to start the solid-state controller 102 at a new firing angle α'. For example, upon determining that the starting current is higher than the motor starting current, then the time for which the current from power supply is provided to the high efficiency induction motor 106 is reduced in the next current cycle by changing the starting angle from α to α'. In some embodiments, updating the starting angle from α to α' may lead to a change in reference current.

At 918, the solid state controller 102 determines whether the high efficiency induction motor 106 is fully started. In response to determining that the high efficiency induction motor 106 is fully started, the process 900 moves to end 920. In response to determining that the high efficiency induction motor 106 is not fully started, the process moves to 904 to repeat the process by starting the high efficiency induction motor 106 and limiting the inrush current. In some embodiments, the determination of whether the high efficiency induction motor 106 is fully started is based on comparing the rotor speed of the high efficiency induction motor 106 with the reference speed. Once the solid-state controller 102 determines that the speed of the high efficiency induction motor 106 has reached the reference speed, the high efficiency induction motor 106 is considered to be completely turned on and operating at normal conditions.

Figure 10:
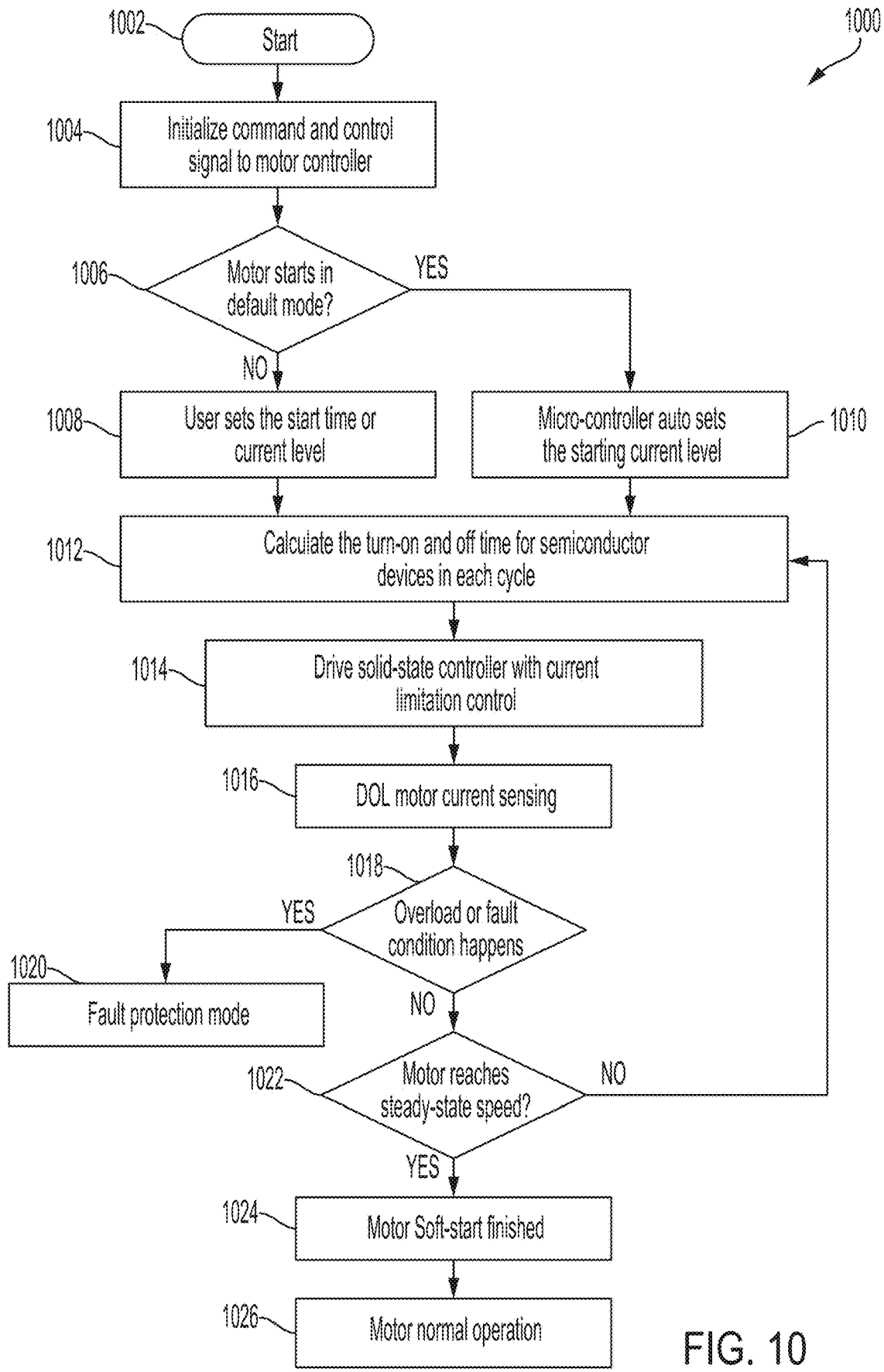
FIG. 10 illustrates a process performed by a solid-state controller, according to one or more examples of the present disclosure.

FIG. 10 illustrates a process performed by a solid-state controller, according to one or more examples of the present disclosure. The process 1000 may be performed by the solid-state controller 102 of system 100 shown in FIG. 1. However, it will be recognized that any of the following blocks may be performed in any suitable order and that the process 1000 may be performed in any environment and by any suitable computing device and/or controller.

In some embodiments, FIG. 10 illustrates the state diagram of the overall control of the solid-state controller. The motor start command and gate control signals are initialized first. Then based on the user's preference, the motor start mode can be in default mode or customized mode. In default mode, the soft-start current or time is pre-set in the micro-controller. In user mode, the soft-start current or time is determined by users and within the safe range of the solid-state controller. The micro-controller calculates the turn-on and off time for the semiconductor devices in the solid-state controller in each cycle. To reduce the voltage stress on the semiconductor devices and save the lift of MOV (MOV is used to protect the device during voltage overshoot), the semiconductor devices turn off at zero current in each control cycle. The zero current turn-off also limits the amount of energy dissipation and provides a high number of operations for the solid-state controller. The solid-state controller can also protect the motor from overload or fault conditions whenever in the solid-start mode or normal operation mode.

At 1002, the process starts the turn-on of a high efficiency induction motor 102.

At 1004, a command and control signal to the motor controller is initialized. For example, the initialize command may connect the high efficiency induction motor 106 to the power supply 104.

At 1006, whether the high efficiency induction motor 106 starts in a default mode is determined. In response to determining that the motor starts in default mode, a microcontroller of the solid-state controller 102 sets a motor starting limit to a predetermined threshold value at 1010. In response to determining that the motor starts in default mode, a microcontroller of the solid-state controller 102 receives a motor starting limit from a user. In some embodiments, the user may also provide a start time of the high efficiency induction motor 106 that may be used to determine the motor starting limit.

At 1012, a turn-on time and turn-off time for semiconductors that are part of the solid-state controller 102 is calculated. The calculation of the turn-on time and the turn-off time is described in more detail in FIG. 9.

At 1014, the solid-state controller 102 is driven with current limitation control. This is described in more detail in FIG. 9.

At 1016, DOL motor current sensing is performed.

At 1018, the DOL motor current sensing is used to determine whether there is fault condition or overload in the high efficiency induction motor 106. In response to determining that a fault condition or overload is detected, the process moves to 1020 and a fault protection mode is activated. In response to determining that a fault condition or overload is not detected, the process moves to 1022 and process 1000 determines whether the high efficiency induction motor 106 has reached a steady-state speed.

In response to determining that the high efficiency induction motor 106 has reached a steady state speed, the process 1000 moves to 1024 and a soft-start phase of the high efficiency induction motor 106 is completed. In response to determining that the high efficiency induction motor 106 has not yet reached a steady state speed, the process 1000 moves to 1014 and continues the soft-start process of the high efficiency induction motor 106.

At 1026, the high efficiency induction motor begins normal operation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A solid-state controller for limiting startup current in an induction motor, the solid-state controller comprising:
   a first comparator configured to generate a first comparison based on comparing a rotor speed of the induction motor with a rotor speed threshold;
   a phase current limiter configured to generate a startup current limit based on the comparison received from the first comparator;
   a second comparator configured to generate a second comparison based on comparing a startup current of the induction motor with the startup current limit; and
   a microprocessor configured to:
      generate a firing phase angle based on the second comparison, wherein the firing phase angle is a phase angle at which the solid-state controller is turned on; and
      generate a stopping time at which the solid-state controller is turned off.

2. The solid-state controller of claim 1, wherein the solid-state controller in the turned-on state connects the induction motor to a power source.

3. The solid-state controller of claim 1, wherein the solid-state controller in the turned-off state disconnects the induction motor from a power source.

4. The solid-state controller of claim 1, wherein the microprocessor is further configured to:
   determine a second rotor speed of the induction motor;
   generate a second startup current limit based on comparing the second rotor speed with the rotor speed threshold;
   generate a third comparison based on comparing the startup current with the second startup current limit; and
   based on determining that the startup current is greater than the second startup current limit, generate a second firing angle.

5. The solid-state controller of claim 4, wherein based on determining that the startup current is less than the second startup current limit, turn-on the solid-state controller at the firing angle.

6. The solid-state controller of claim 1, wherein the microprocessor is further configured to turn on the solid-state controller based on determining that the induction motor is in normal operation.

7. The solid-state controller of claim 1, wherein the rotor speed threshold is the regular operation speed of the induction motor.

8. A method for limiting startup current in an induction motor using a solid-state controller, the method comprising:
   providing a first comparator configured to generate a first comparison based on comparing a rotor speed of the induction motor with a rotor speed threshold;
   providing a phase current limiter configured to generate a startup current limit based on the comparison received from the first comparator;

providing a second comparator configured to generate a second comparison based on comparing a startup current of the induction motor with the startup current limit; and providing a microprocessor configured to:
generate a firing phase angle based on the second comparison, wherein the firing phase angle is a phase angle at which the solid-state controller is turned on; and generate a stopping time at which the solid-state controller is turned off.

9. The method of claim 1, wherein the solid-state controller in the turned-on state connects the induction motor to a power source.

10. The method of claim 1, wherein the solid-state controller in the turned-off state disconnects the induction motor from a power source.

11. The method of claim 1, wherein the microprocessor is further configured to:
determine a second rotor speed of the induction motor;
generate a second startup current limit based on comparing the second rotor speed with the rotor speed threshold;
generate a third comparison based on comparing the startup current with the second startup current limit; and
based on determining that the startup current is greater than the second startup current limit, generate a second firing angle.

12. The method of claim 10, wherein based on determining that the startup current is less than the second startup current limit, turn-on the solid-state controller at the firing angle.

13. The method of claim 1, wherein the microprocessor is further configured to turn on the solid-state controller based on determining that the induction motor is in normal operation.

14. The method of claim 1, wherein the rotor speed threshold is the regular operation speed of the induction motor.

* * * * *